United States Patent [19]

Trull et al.

[11] Patent Number: 4,640,137
[45] Date of Patent: Feb. 3, 1987

[54] TACTILE SENSOR

[75] Inventors: Michael W. Trull, Cary; Richard C. Powell, Apex, both of N.C.

[73] Assignee: Lord Corporation, Erie, Pa.

[21] Appl. No.: 739,676

[22] Filed: May 31, 1985

[51] Int. Cl.$^4$ .................. G01D 7/02; H01C 10/10
[52] U.S. Cl. ...................... 73/862.04; 73/865.7; 338/47; 338/114
[58] Field of Search ............ 73/862.04, 862.68, 432 T; 338/47, 99, 114; 178/18; 340/365 A; 200/159 B

[56] References Cited

U.S. PATENT DOCUMENTS

| | | | |
|---|---|---|---|
| 3,699,294 | 10/1972 | Sudduth | 340/365 A |
| 4,013,835 | 3/1977 | Eachus et al. | 340/365 A |
| 4,014,217 | 3/1977 | Lagasse et al. | |
| 4,018,999 | 4/1977 | Robinson et al. | 200/159 B |
| 4,315,238 | 2/1982 | Eventoff | 338/114 X |
| 4,481,815 | 11/1984 | Overton | |
| 4,492,949 | 1/1985 | Peterson et al. | |

OTHER PUBLICATIONS

"Tactile Sensing for End-Effectors", Peter N. Cholakis, Barry Wright Corporation, Watertown, Mass.
"Design and Implementation of a VLSI Tactile Sensing Computer", Fall 1982 Marc H. Raibert & John E. Tanner; Int. Journal of Robotics Research, vol. 1, #3.
"Active Touch Sensing", William Daniel Hillis, Massachusetts Institute of Technology Artificial Intelligence Lab, Apr. 1981, AI Memo 629, pp. 1-37.

Primary Examiner—Charles A. Ruehl

[57] ABSTRACT

A sensitive, durable, high resolution tactile sensor particularly suited for use as a robot end effector in an automated manufacturing process. The tactile sensor has an array of pressure sensing sites provided by a series of current emitter electrodes surrounded by a series of companion current collector electrodes both of which engage a rough conductive layer carried on the underside of a resilient platen. The emitters are electrically connected together in parallel rows, and the collectors are electrically connected together in parallel columns above and across the rows. The emitters and collectors are electrically insulated from one another as are the rows and columns. When the platen engages an object to apply pressure at one of the sites, and a positive voltage is applied to an emitter electrode, current flows from the emitter electrode and through the conductive layer to the companion collector electrode from which it is collected and measured. Cross-multiplexing circuitry scans the rows and columns periodically to provide a readout of both the location and magnitude of applied pressure.

30 Claims, 11 Drawing Figures

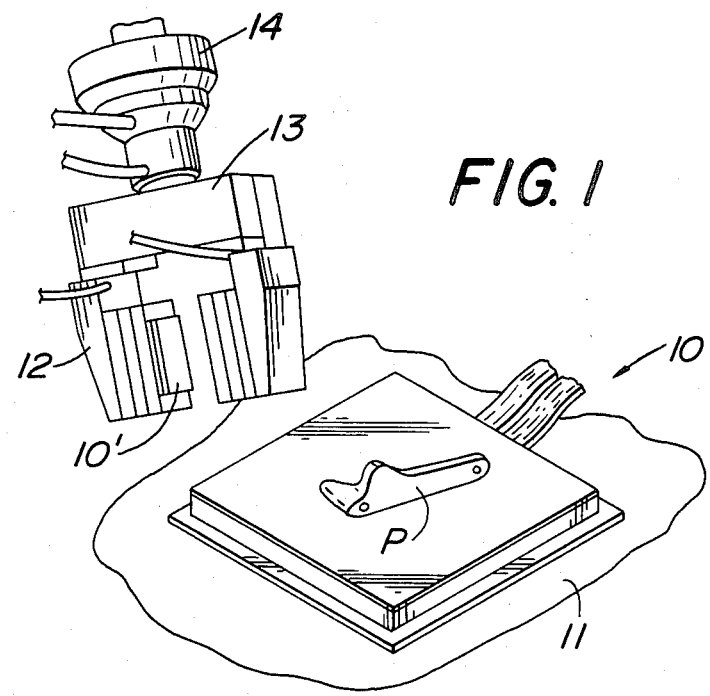
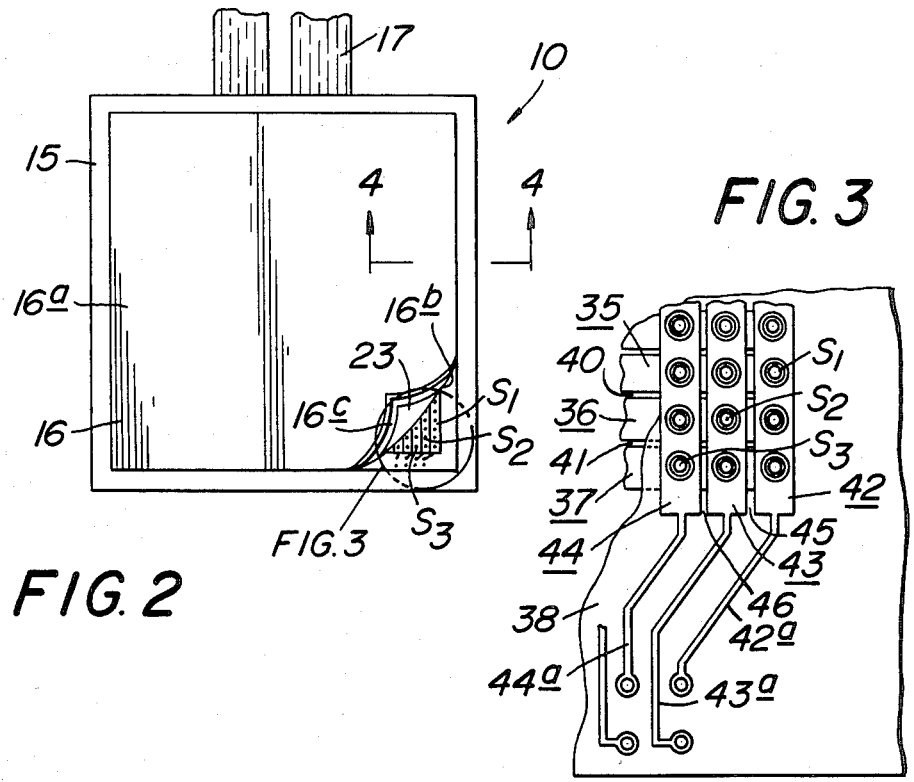
FIG. 1
FIG. 3
FIG. 2

TACTILE SENSOR

FIELD OF THE INVENTION

The present invention relates to tactile sensors, and more particularly, the present invention relates to tactile sensors which are particularly suited for use with automated equipment of various types, including robots and robot end effectors.

BACKGROUND OF THE INVENTION

Increasingly sophisticated types of automated equipment, such as robots, are being used in a wide variety of manufacturing operations, including inspection, identifiction, pick and place procedures, assembly procedures, and the like. To enable robotic equipment to grip parts in a particular manner without damaging the same, some robots are being equipped with end effectors, or jaws, having tactile sensors which give the end effectors a certain degree of feelability. Other automated equipment utilizes work surface mounted sensors to provide sensory feedback to assist in the manipulation of parts thereon. The tactile sensors are electrically connected to suitable circuitry associated with the equipment to enable various parameters of a part, including its size and shape, and the force exerted on the part, to be detected.

BRIEF DESCRIPTION OF THE PRIOR ART

Tactile sensors which operate on various principles are known. For instance, a satisfactory optoelectric tactile sensor manufactured by Lord Corporation of Erie, Pa. has a flexible platen with an array of depending projections which cooperate with light emitters and receivers disposed on opposite sides of the projections to provide electrical outputs when the portion of the platen superadjacent the projection is deflected and light transmission between the emitters and receivers is modulated by movement of the projections.

A tactile sensor which utilizes a pressure responsive electrically conductive elastomer is disclosed in U.S. Pat. No. 4,014,217 to Lagasse et al. This sensor has a series of annular electrodes which surround a series of central electrodes and which cooperate with a doped elastomeric member to produce a readout when current fields, established in the elastomeric member by the electrodes, are altered by applied pressure.

One form of tactile sensor which incorporates discrete semi-conductive sensing sites is disclosed in U.S. Pat. No. 4,492,949 to Peterson. This sensor includes a compressible panel having a series of pressure responsive electrically conductive posts distributed in an array between a series of rows of partially exposed conductors embedded in a flexible member overlying the panel and a series of columns of partially exposed conductors embedded in a base underlying the panel orthogonal to the rows. The posts are located at the intersections of the rows and columns so that when pressure is applied superadjacent each post, its electrical resistance decreases, permitting current flow from a row to a column. The rows and columns are sequentially scanned by suitable cross-multiplexing circuitry to provide a readout of the location and magnitude of applied pressure.

The utilization of cross-multiplexing electronic circuitry in combination with tactile sensors, such as described in the above-referenced patent to Peterson, the disclosure of which is incorporated by reference herein, provides the advantage of enabling the density of sensing sites to be increased and thereby to increase the resolution of the sensor. A limiting factor in achieving high resolution, however, has been the introduction of electrical cross-talk, or phantom switching phenomenon, in cross multiplexed sensor systems. To overcome this problem, some sensors have diodes located at each sensing site, such as disclosed in U.S. Pat. No. 4,481,815 to Overton.

For a more complete review of the state of the art with respect to tactile sensing using conductive elastomers, reference is made to the following articles: Peter and Cholakis, "Tactile Sensing For End-Effectors", Barry Wright Corporation, Watertown, Mass.; Marc H. Raibert and John E. Tanner, "Design And Implementation Of A VLSI Tactile Sensing Computer", The International Journal of Robotics Research, Volume 1, No. 3, Fall 1982; William Daniel Hillis, "Active Touch Sensing", Massachusetts Institute of Technology Artificial Intelligence Laboratory, April 1981, AI Memo 629, pp. 1–37; and Purbrick, John A., "A Force Transducer Employing Conductive Silicone Rubber", Proc. 1st, Robot Vision and Sensors Conf., IFS Pubs., Ltd., Kempston, Bedford, England, 1980, pp. 73–80.

Prior art tactile sensors have various drawbacks. Those utilizing optoelectric principles are expensive to manufacture. Those utilizing electrically conductive elastomers have low sensitivity and a proclivity to wear because the conductive particles doping the elastomer affect adversely its mechanical properties. Those sensors utilizing discrete pressure sensitive posts in a cross-multiplexing array, and those incorporating diodes, are expensive to manufacture. Furthermore, each of the prior art sensors has limited resolution and sensitivity, and none is as durable and inexpensive to manufacture as desired.

OBJECTS OF THE INVENTION

With the foregoing in mind, a primary object of the present invention is to provide a novel tactile sensor which overcomes the limitations of known tactile sensors.

Another object of the present invention is to provide an improved tactile sensor which provides both high resolution and sensitivity in a large field.

A further object of the present invention is to provide a rugged tactile sensor which is relatively inexpensive to manufacture.

As a still further object, the present invention provides a method and apparatus for accurately sensing pressure distribution over a relatively large area with a minimum of components.

As yet another object, the present invention provides a tactile sensor which operates in a cross-multiplexing mode with a minimum of interference caused by electrical cross-talk and phantom switching.

SUMMARY OF THE INVENTION

More specifically, the present invention provides tactile sensing apparatus which functions in a novel manner to provide an accurate readout of both the magnitude and distribution of pressure applied to a sensing surface.

The sensor comprises a resilient platen having an upper surface adapted to be contacted by an object and a lower surface overlying a plurality of spaced pressure sensing sites. Each site includes emitter electrode means and companion collector electrode means surrounding the emitter electrode means in spaced relation therewith. Flexible conductive means on the lower surface of the platen cooperates with the emitter and collector means to cause substantially all of the current emitted by an emitter means to be collected by its companion collector means when the platen is deflected downwardly superadjacent the sensing site and a voltage differential is applied across the emitter and collector means.

Preferably, the sensing sites are provided by a series of current emitter electrodes electrically interconnected in a row by a bus bar and a series of current collector electrodes surrounding the current emitter electrodes and electrically connected in a column by another bus bar disposed above and across the row. The emitter electrodes are electrically insulated from their companion collector electrodes, and the bus bars defining the rows and columns are electrically isolated from one another. The rows are provided on the underside of an insulated panel, and the columns are provided on the topside thereof coplanar with the emitter electrodes. A resilient platen overlies the array of emitter and collector electrodes and has on its underside a thin, rough coating of electrically conductive material engaging the emitter and collector electrodes. A means is provided for simultaneously supplying a positive voltage to a selected one of the rows of emitter electrodes and a lower voltage to the columns for causing current to flow at a site under pressure from one of the emitters at such site, through the coating, and to the companion collector for collection and measurement by multiplexing circuitry which repeats these steps periodically to produce a readout of both the location and magnitude of applied pressure.

BRIEF DESCRIPTION OF THE DRAWINGS

The foregoing and other objects, features and advantages of the present invention should become apparent from the following description when taken in conjunction with the accompanying drawings, in which:

FIG. 1 is a fragmentary perspective view illustrating a few different applications for a tactile sensor embodying the present invention;

FIG. 2 is a plan view of a tactile sensor embodying the present invention with a portion of its sensing surface peeled back to reveal certain interior construction details;

FIG. 3A is a schematic representation of some of the FIG. 3 sensor circuit components in association with control components and circuitry;

DESCRIPTION OF THE PREFERRED EMBODIMENTS

Figure 3:
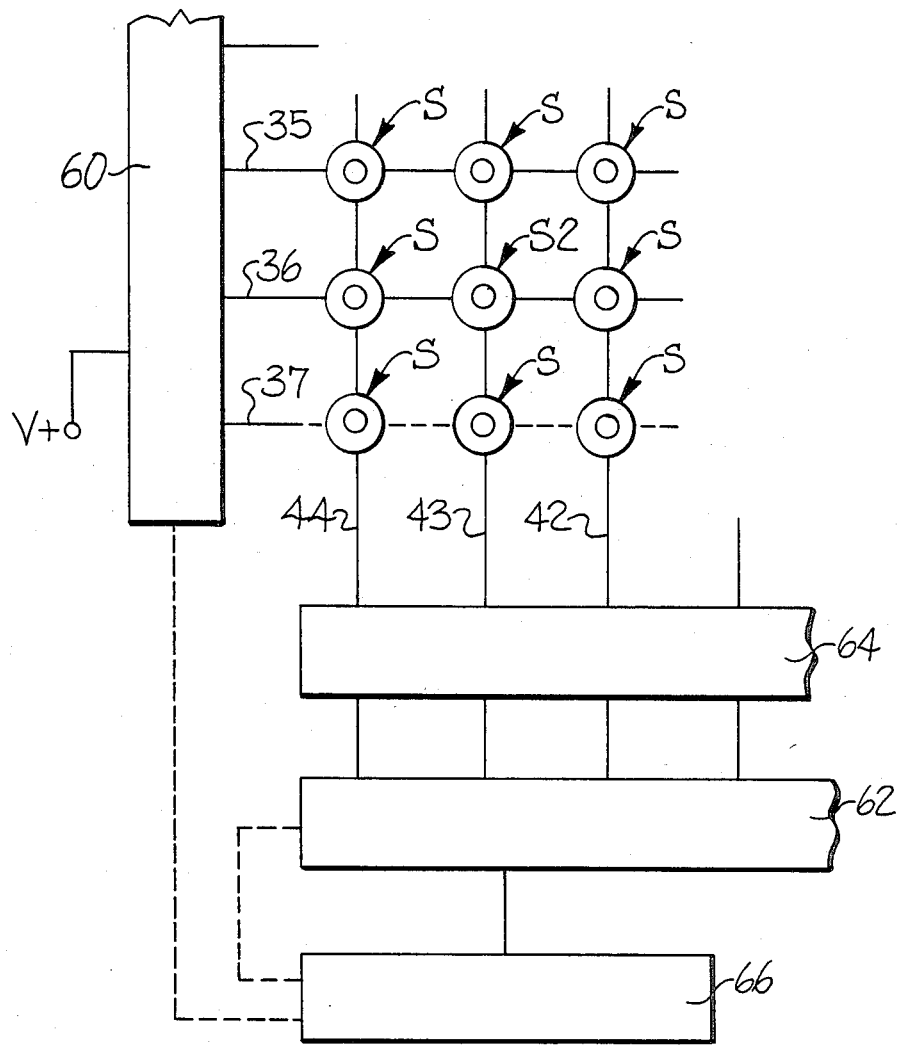
FIG. 3 is a greatly enlarged fragmentary plan view of the revealed portion of the sensor illustrated in FIG. 2.

Referring now to the drawings, FIG. 1 illustrates a tactile sensor 10 which embodies the present invention. The tactile sensor 10 may be supported on a work surface 11 for sensing the orientation of a part P in an assembly operation; or, a smaller version 10' thereof may be mounted on one or both movable elements 12 of an end effector 13 mounted at the end of a robot arm 14 to enable the part P to be gripped in the proper manner with the proper amount of pressure.

As discussed heretofore, known tactile sensors are limited in resolution, sensitivity, durability and manufacturability. In addition, known tactile sensors utilizing cross-multiplexing techniques to maximize field size and minimize components have been plagued by electrical cross-talk and phantom switching problems which may be described briefly as the proclivity for electrical activity at one pressure sensing site to produce an output at an adjacent pressure sensing site. Attempts to overcome these problems either by complex mechanical structures or by connecting electrical components in the structure have not been entirely satisfactory.

The tactile sensor of the present invention overcomes the limitations of known prior art tactile sensors. For instance, it has high spatial resolution and fine sensitivity over a relatively large sensing area. In addition, it is durable and capable of being manufactured readily. Furthermore, tactile sensing apparatus embodying the present invention functions accurately to sense objects by eliminating electrical cross-talk among its various sensing sites.

Referring again to the drawings, and particularly to FIG. 2 thereof, the tactile sensor 10 of the present invention comprises a frame 15 which may be of any shape but which, in the illustrated embodiment, is square. A resilient platen 16 is mounted to the frame 15 by a layer of adhesive extending around its peripheral margin. The platen 16 has an obverse surface, or topside 16a, adapted to engage an object, such as the part P illustrated in FIG. 1, and a reverse surface, or underside 16b. One or more wiring harnesses, such as the wiring harness 17, are povided for connecting the sensor 10 to suitable circuitry in a manner to be described.

The tactile sensor 10 has high resolution. To this end, an array of closely spaced pressure sensing sites, such as the sites $S_1$, $S_2$ and $S_3$ (indicated within the perimeter of the circle denominated "FIG. 3" in FIG. 2) are provided within the frame 15 underneath the platen 16. The field, or area, occupied by the sensing sites $S_1$–$S_3$ is substantially square and coextensive with the area of the platen 16. Preferably, the sensing sites $S_1$–$S_3$ are located at equally spaced horizontal and vertical intervals having, by way of example, center to center spacings on the order of less than about 0.100 inches, and more preferably, about 0.080 inches, thereby enabling 6400 sensing sites to be arranged in a field of less than 40 square inches for a sensing site density in excess of 150 sites per square inch.

Figure 5:
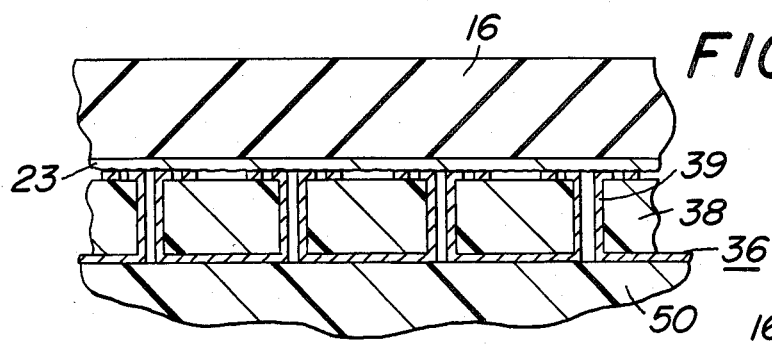
FIG. 5 is a greatly enlarged sectional view of the area contained within the circle illustrated in FIG. 4.
Figure 6:
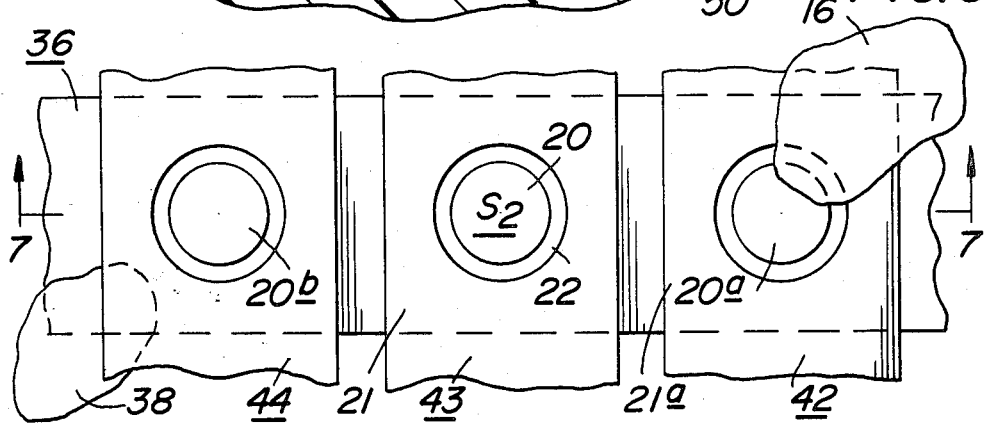
FIG. 6 is an enlarged somewhat schematic fragmentary plan view of certain sensor elements.

According to the present invention, pressure sensing is accomplished by powering the emitter electrodes at the sites and measuring the current collected by their respective companion collector electrodes. As best seen in FIG. 6, each sensing site, such as the central site $S_2$ comprises an emitter electrode 20 surrounded by a companion collector electrode 21 disposed coplanar therewith and spaced therefrom by a continuous annular gap 22 of a very narrow width, such as 0.008 inches. A continuous, flexible conductive coating, or layer, 23 (FIG. 5) is disposed on substantially the entire undersurface 16b of the platen 16, except at its peripheral margin 16c, to provide omnidirectional resistivity on the platen undersurface 16c and to cooperate with the the platen 16 to provide a plurality of microprotrusions forming an asperity, or roughness, on its undersurface 16b. Thus, when the platen 16 is deflected downwardly into engagement with electrodes 20, 21 at an underlying site, such as the site $S_2$, the layer 23 bridges the gap 22 between the electrodes and conducts current from emitter electrode 20 to collector electrode 21.

The magnitude of the current conducted from emitter electrode 20 to collector electrode 21 is a function of both fixed and variable parameters. The fixed parameters include: (1) the lateral resistance of layer 23, i.e. along the platen 16, which is relatively great when (as in the preferred illustrative embodiment) the layer is very thin; (2) the relative sizes in a lateral direction of the narrow gap 22 and the relatively wide collector electrode 21; and (3) the lateral dimensions of the gaps or spaces 25a, 25b between the collector electrode and any adjacent collector electrode, such as the gap 25a between the central collector electrode 21 and the collector electrode 21a of the right hand sensitive site illustrated in FIG. 7. A variable parameter affecting the magnitude of the current conducted from emitter electrode 20 to collector electrode 21 is due to the microprotrusions that impart an asperity, or roughness, to the layer 23.

When the pressure effecting engagement between layer 23 and the underlying pair of emitter and collector electrodes is small, the microprotrusions provide only a small area of contact between the layer and the electrodes. The resistance to current flow from emitter electrode 20 to collector electrode 21 is therefore high, and the current flow is low. A greater pressure upon platen 16 increases the area of contact of the layer with the electrodes 20, 21, thus decreasing the resistance and increasing the current flow from emitter 20 to collector 21. By monitoring the current received by the collector 21 at a particular site, the pressure upon such site can be ascertained and a grey scale, or analog, output signal produced, provided that such electrode receives only current from its companion emitter electrode 20 and not also, or instead, from an emitter electrode at some other site.

To satisfy the foregoing condition, to prevent electrical cross-talk among the various sensitive sites, and to maximize the available current signal strength, substantially all of the current received by layer 23 from an emitter electrode at a particular site is transmitted to and into the companion collector electrode at such site. No significant amount of such current is transmitted to any other site. This results in highly desirable site localization of electrical activity of the emitted current which, in part, is attributable to the emitter electrode at each site being totally encircled or surrounded by its annular companion collector electrode. Site localization of electrical activity is also attributable to the differing resistances to current flow that are present within and between the sensitive sites by reason of the component size and spacing parameters previously described.

Figure 8:
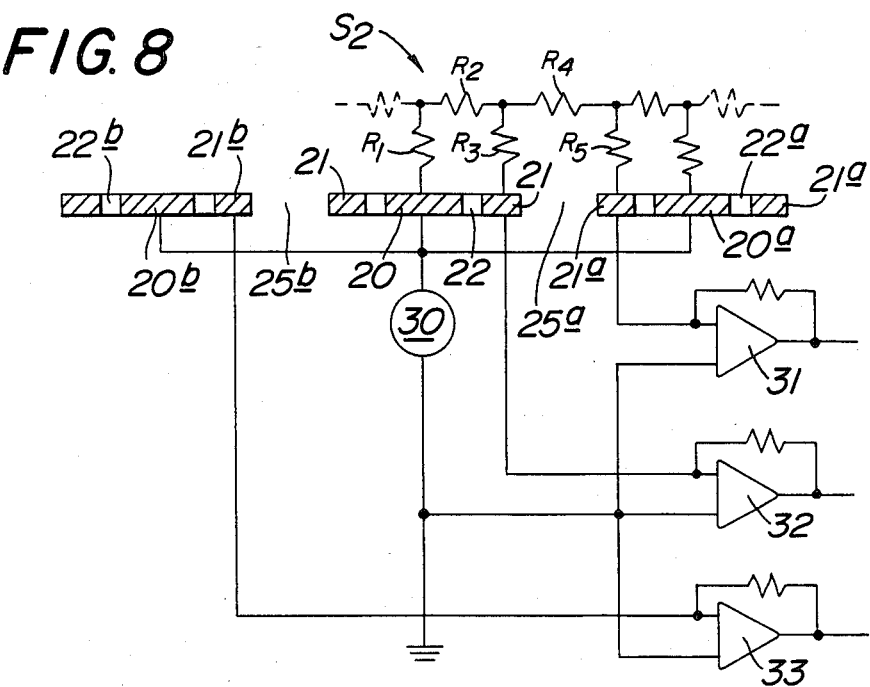
FIG. 8 is an electrical schematic diagram illustrating certain principles of operation of the present invention.

The differing resistances to current flow are schematically illustrated in FIG. 8, to which reference is now made. Resistances $R_1$, $R_3$ and $R_5$ represent variable ones whose magnitude is a function of the pressure imposed upon the platen 16. The magnitude of resistance $R_3$ is also dependent upon the lateral, or radial, dimension of collector electrode 21, as is the resistance $R_5$. Resistance $R_2$ has a magnitude determined by the resistivity of layer 23, by the lateral dimensions of the gap 22, and by the pressure applied to that portion of platen 16 overlying electrodes 20, 21. The magnitude of resistance $R_4$ is dependent upon the resistivity of layer 23, upon the size of the lateral gap or spacing between adjacent collector electrodes, at any adjacent sensitive site, such as the gap 25a between the collector electrode 21 and the collector electrode 21a, and upon the pressure applied to the overlying platen 16 at the sensitive site in question and at the adjacent site or sites. The resistance $R_3$ under all operating conditions is much less than the sum of the resistances $R_4$ and $R_5$, i.e. $R_3 < < R_4 + R_5$.

Figure 7:
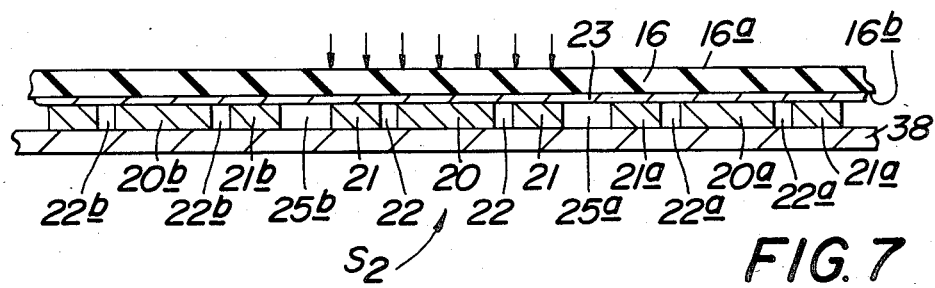
FIG. 7 is a sectional view taken on line 7—7 of FIG. 6.

Thus, when emitter electrode 20 is energized from a suitable power source 30, and a pressure (such as indicated in FIG. 7) is applied upon the portion of the platen 16 overlying such electrode 20 and its companion collector electrode 21, substantially all of the current conducted from emitter 20 follows the path that includes the resistances $R_1$, $R_2$ and $R_3$, extending to collector 21, rather than any alternative path (such as the illustrated one which includes resistances $R_1$, $R_2$, $R_4$ and $R_5$) extending to an adjacent sensitive site. In other words, the resistance between the emitter 20 and an adjacent non-companion collector 21a, and the resistance between the emitter 20a and an adjacent non-companion collector 21, is greater than the resistance between either emitter electrode 20 or 20a and its respective companion collector electrode 21 or 21a. Amplifier 32 monitors current received by collector 21 and provides an output signal voltage representative of the magnitude of the applied pressure. The amplifiers 31-33 also function in a conventional manner to apply virtual ground electrical potential to their respective collectors.

In order to enable the location of pressure application to be determined, and to simplify the sensor design and support circuitry, the sensor 10 is designed to be operated in conjunction with cross-multiplexing means, such as the type of circuitry disclosed in the above referenced Peterson patent, the disclosure of which is incorporated by reference herein. To this end, the emitter electrodes, such as the electrodes, 20, 20a and 20b, are each electrically interconnected to a bus bar 35 (FIGS. 3 and 3A), provided on the underside of an insulated panel 38. In the present instance, such connection is provided by transverse pins, such as the hollow pin 39 (FIG. 5) projecting upwardly from the bus bar 35 through the panel 38. A series of bus bars, such as the bars 36 and 37, extend in rows in spaced parallel relation with the bar 35 in the manner illustrated in FIGS. 3 and 3A. The bus bars 35-37 are electrically isolated from one another along their lengths by small air gaps 40, 41 to define horizontal rows of electrically interconnected emitter electrodes.

The collector electrodes, such as the electrodes 21a, 21 and 21b, are electrically interconnected on the topside of the panel 38 by means of conductive bus bars 42, 43 and 44 which form the electrodes, such as in the manner the electrode 21 of sensing site $S_2$ (FIG. 6) is formed integral with, and thus connected to, the bus bar 43. The bus bars 42-44 are arranged in parallel relation in vertical columns and are separated laterally from one another along their lengths by small air gaps 45, 46, respectively providing electrical isolation therebetween. The collector bus bars 42–44 are disposed at right angles to the emitter bus bars 35–37, and the sensing sites $S_1$–$S_3$ are located at the intersections thereof.

The insulating air gaps 45 and 46 between the columnar bus bars 42–44, and the corresponding air gaps 40 and 41 between the rows of bus bars 35–37 are small, each gap being on the order of 0.008 inches. Preferably, the rows and columns of bus bars, such as the bus bars 42–44, are provided with extensions 42a–44a which terminate in plated pin holes in the margin of the panel 38 to permit the wiring harnesses 17 to be connected by conventional connectors. The reverse surface of the platen 16 is left uncoated around its peripheral margin at 16c to provide electrical insulation above the bus bar extensions and pin connections. The emitters, collectors and their respective bus bars are provided on the panel 38 by conventional printed circuit manufacturing processes which involve plating through holes in the panel 38 to provide the emitter electrode pins and then etching away conductive material to provide the referenced air gaps and to define the bus bars and the current emitter and collector electrodes.

As is indicated in FIG. 3A the control circuitry and components utilized in the present invention include cross-multiplexing means in the form of a multiplexer 60 that applies a positive voltage to a selected one of the bus bar rows, such as the bus bar 36, and a demultiplexer 62 that applies a lower voltage, preferably at virtual ground potential, to each of the bus bar columns, or to at least a three unit group such as that comprised of the bus bars 42, 43 and 44. This establishes a pressure responsive current flow path through the conductive layer 23 between each emitter electrode of the selected bus bar and its companion collector electrode at a site, such as at sensing site $S_2$, under applied pressure. Current flow in successively selected ones of the columnar bus bars, such as bar 43, is directed to an analog to digital converter 64, which may be an array of operational amplifiers such as shown in FIG. 8, that converts the current to a proportional voltage signal. The voltage signal is transmitted from converter 64 by demultiplexer 62 to a computer 66 that controls or at least monitors operation of multiplexers 62, 64. The computer correlates each voltage signal and site location, and provides an appropriate readout or display identifying the location or identity of each site S along the active emitter bus bar row that is under an applied pressure, and identifying the magnitude of such pressure. These steps are repeated for each other row on a row by row basis.

While all of the columns may be held to virtual ground potential during multiplexing, only three need be. For instance, only the pair of columns 42 and 44 alongside the column 43 being read must be held at ground potential. Therefore, groups of three columns may be scanned across each row when activated.

Figure 9:
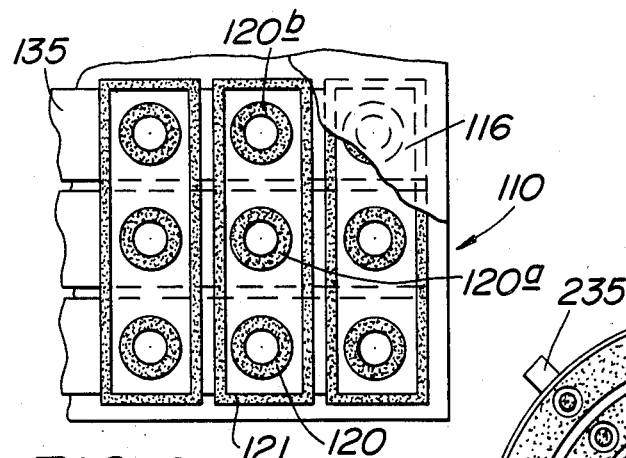
FIG. 9 is an enlarged fragmentary plan view of a portion of a modified embodiment of the present invention.

The emitter and collector electrodes may be arranged in a pattern such as illustrated in the portion of a sensor 110 of FIG. 9 wherein a common collector electrode, such as the electrode 121, surrounds a group of three emitter electrodes, such as the emitter electrodes 120, 120a, and 120b. With this arrangement, when voltage is applied to one of the rows, such as the row 135 connected to the upper emitter electrode 120b, current collected by the collector electrode 121 is representative of the pressure applied to the platen 116 superadjacent the emitter electrode 120b. By activating each row sequentially and measuring current flow from each column while a row is activated, pressure applied at each sensing site may be determined.

Figure 10:
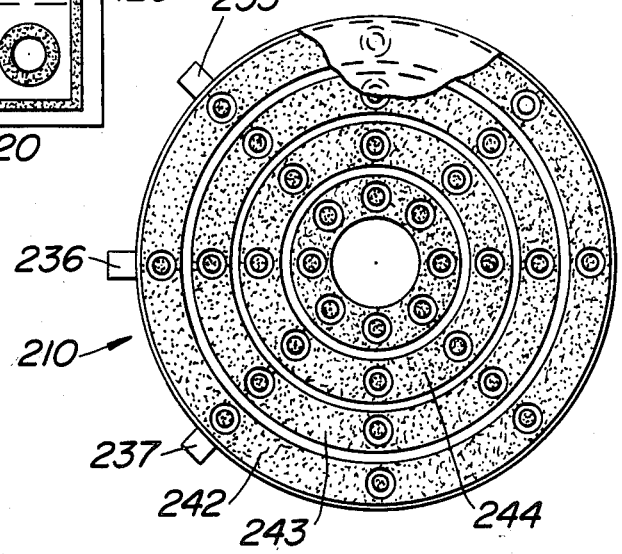
FIG. 10 is a plan view of another modified embodiment of the present invention.

If desired, the rows and columns of emitter electrodes and collector electrodes may be arranged in various other patterns than described heretofore, such as the circular pattern illustrated in the modified sensor 210 of FIG. 10 wherein the rows 235–237 extend radially and the columns 242–244 extend circumferentially about an open center.

The tactile sensor of the present invention is capable of being manufactured readily. To this end, the platen 16 is fabricated from a sheet of relatively soft elastomeric material, such as natural or synthetic rubber. The underside of the platen 16 is spray coated with an electrically conductive polyurethane which comprises conductive particles in an elastic carrier, such as H322 and L300 manufactured by the Chemical Products Group of Lord Corporation, Erie, Pa. The spray should deposit the polyurethane in as thin a coating as possible, and preferably the coating should have a thickness of less than about one mil. The microprotrusions provided by the coating should have a roughness which is less than that which would be visible to the naked eye or palpable by touch.

Figure 4:
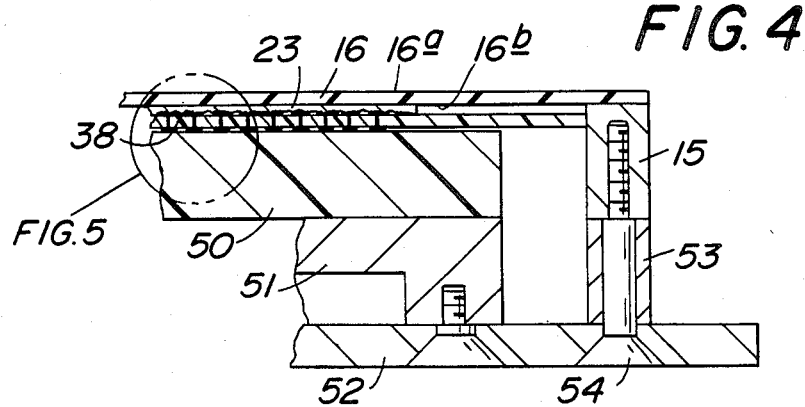
FIG. 4 is an enlarged fragmentary cross-sectional view taken on line 4—4 of FIG. 2.

The sensor 10 can be assembled readily. To this end, as best seen in FIG. 4, the panel 38 is mounted beneath the conductive coating 23 on the underside of the platen 16 by a rigid insulating board 50 which underlies the panel 38 and extends substantially coextensively with the area of the platen 16. The insulating board 50 is supported on an inner frame 51 which, in turn, is fastened to a base 52 to which the frame 15 is secured by means of a spacer 53 and fastener 54. This arrangement permits the various electrical connections to be provided in the margin of the panel 38 at spaced peripheral locations, such as illustrated in FIG. 3.

In view of the foregoing, it should be apparent that the present invention now provides an improved tactile sensor which is characterized by high resolution, sensitivity, durability and ready manufacturability.

While preferred embodiments of the present invention have been described in detail, various modifications, alterations and changes may be made without departing from the spirit and scope of the present invention as defined in the appended claims.

We claim:

1. A tactile sensor for identifying the magnitudes and locations of pressures applied substantially contemporaneously thereto at a plurality of locations thereon, comprising:

a resilient platen having upper and lower surfaces;

a plurality of laterally spaced pressure sensing sites underlying said lower surface;

each of said pressure sensing sites including emitter electrode means and companion collector electrode means surrounding said emitter electrode means in spaced relation therewith;

flexible conductive means on said lower surface of said platen overlying said pressure sensing sites and cooperable therewith when said platen is deflected downwardly against a selected site to receive current emitted from said emitter electrode means and to conduct to said companion collector electrode means substantially all of the current flowing into the conductive means from said emitter electrode means; and control means for measuring, and for determining the locations of said sites constituting the source of, the current conducted from said emitter electrode means to said collector electrode means at each of said sites.

2. A tactile sensor according to claim 1 wherein said flexible conductive means includes a plurality of conductive microprotrusions on said lower surface cooperable with said platen to provide decreased resistance in response to increased downward pressure between said platen and said electrode means.

3. A tactile sensor according to claim 1 wherein said platen includes an electrically non-conductive elastomeric member and said conductive means includes electrically conductive particles distributed in an elastomeric carrier.

4. A tactile sensor according to claim 1 including means connecting said emitter electrode means together in laterally spaced rows, means connecting said collector electrode means together in laterally spaced columns disposed at an angle to said rows, and panel means mounting said rows and columns and electrically isolating the same from one another both laterally and in the direction of pressure application.

5. A tactile sensor according to claim 1 wherein said control means includes multiplexing circuit means adapted to be connected to the emitter electrode means for applying thereto in a selected one of said sites a positive voltage potential and for simultaneously applying a lower voltage potential to its companion and adjacent collector electrode means.

6. A tactile sensor for identifying the locations of pressures applied substantially contemproaneously thereto at a plurality of locations thereon, comprising;
- a series of sensing sites arranged in a predetermined pattern;
- one of said sites including first current emitter means, and
- first current collector means surrounding said first current emitter means;
- another of said sensing sites including second current emitter means spaced laterally from said first current emitter means, and
- second current collector means surrounding said current emitter means;
- a resilient platen having an obverse contact surface and a reverse surface;
- flexible conductive means on said reverse surface of said platen cooperating therewith to provide microprotrusions transverse thereto, said conductive means engaging said current emitter and collector means and providing a portion of a circuit the resistance of which varies inversely with pressure applied across the conductive means;
- mounting means extending along the reverse surface of said platen for mounting said first and second current collector means in laterally spaced electrically insulated relation to define through said flexible conductive means a higher resistance to current flow between said first emitter means and said second collector means and between said second emitter means and said first collector means than provided between either current emitter means and its companion current collector means;
- whereby substantially all of the current flowing into the flexible conductive means from one emitter means is collected in its companion collector means.

7. A tactile sensor according to claim 6 wherein said resilient platen includes a subtantially electrically non-conductive elastomeric member.

8. A tactile sensor according to claim 6 wherein said flexible conductive means is disposed in a continuous thin film over the area of said reverse surface engaged by said current emitter and collector means.

9. A tactile sensor according to claim 6 wherein said first current emitter means includes a series of current emitters arranged in a predetermined pattern and said first current collector means surrounds each of said current emitters in said pattern.

10. A tactile sensor according to claim 6 wherein said first and second current emitter means includes first and second series of current emitters each arranged in a predetermined pattern, said first and second current collector means each extend in a perimeter around their respective series of current emitters, and said current collector means are separated from one another by said mounting means.

11. A tactile sensor according to claim 6 wherein said first and second current emitter means are arranged in columns, and including means extending laterally of said columns underneath said mounting means and electrically connecting in rows laterally adjacent emitters in each column.

12. A tactile sensor according to claim 11 wherein said columns and rows are straight and are disposed at an angle to each other.

13. A tactile sensor according to claim 11 wherein said columns are circular and said rows are disposed radially with respect thereto.

14. A tactile sensor according to claim 6 wherein said mounting means includes an electrically insulated panel extending along said platen in parallel relation.

15. A tactile sensor according to claim 6 including frame means connecting said platen to said mounting means and maintaining said emitter and collector means in continuous contact with said flexible conductive means.

16. A tactile sensor for generating a machine image of an object engaging and exerting pressures at a plurality of locations upon said sensor, comprising:
- an electrically substantially non-conductive elastomeric member having a top surface adapted to contact an object and a bottom surface;
- a flexible conductive layer on said bottom surface providing a plurality of microprotrusions transverse thereto, said conductive layer providing a portion of a circuit having an electrical resistance which varies inversely with pressure applied transversely thereto;
- an electrically insulated panel underlying said elastomeric member and having a topside and a bottomside;
- a first series of current emitter electrodes mounted in spaced relation in a first column on the topside of said panel;
- at least a second series of current emitter electrodes mounted in spaced relation on the topside of said panel in a second column extending alongside said first column;
- a first current collector means mounted on said panel in said first column and surrounding each of said emitter electrodes in said first column in coplanar relation therewith;
- at least a second current collector means mounted on said panel in said second column and surrounding each of said emitter electrodes in said second column in coplanar relation therewith;

each of said emitter electrodes in said first and second columns being spaced laterally from their respective first and second collector means to provide electrical insulation therebetween;

said first current collector means being spaced laterally from the second current collector means to provide electrical isolation therebetween;

current supply means disposed in spaced rows on the underside of said panel transverse to said columns for supplying current to said current emitter electrodes in said columns; and frame means mounting said elastomeric member and panel in parallel relation with said emitter electrodes and said collector means engaged with said conductive layer;

whereby substantially all of the current supplied to each current emitter electrode flows transversely into the conductive layer, laterally therethrough, and transversely into its companion current collector means when pressure is applied to the elastomeric member superadjacent thereto.

17. A tactile sensor according to claim 16 wherein said elastomeric member has an asperity on its bottom surface providing said microprotrusions.

18. A tactile sensor according to claim 16 wherein said conductive layer includes a continuous coating of electrically conductive elastomeric material.

19. A tactile sensor according to claim 16 wherein said elastomeric member includes soft natural rubber and said conductive layer includes an electrically conductive polyurethane having a thickness of less than about one mil.

20. A tactile sensor according to claim 16 wherein each electrode in said first and second series of current emitter electrodes is circular and said first and second collector means are linear and have circular holes surrounding said circular electrodes to provide a continuous annular insulated gap therebetween, and said first and second collector means extend in spaced parallel relation to provide a continuous elongate insulated gap therebetween.

21. A tactile sensor according to claim 16 wherein said emitter current supply means includes rows of conductive bus bars mounted on the bottomside of said panel in spaced parallel relation, and a series of pins extending transversely therefrom through the panel in electrical contact with the current emitter electrodes in each laterally adjacent column.

22. A tactile sensor according to claim 21 wherein said current emitter electrodes, collector means and bus bars are plated onto opposite sides of said panel, and said pins include plated walls defining through holes in the panel at the junction of the emitter electrodes with the bus bars.

23. A tactile sensor according to claim 16 wherein each of said collector means continuously surrounds each emitter electrode of a corresponding one of said columns.

24. A tactile sensor according to claim 16 wherein said current emitter electrodes are located on center to center spacings of less than about 10 mils.

25. A tactile sensor according to claim 16 wherein said emitter electrodes are arranged in a density in excess of about 150 per square inch.

26. Apparatus for use in providing a machine image of an object, comprising:

means providing a plurality of closely-spaced pressure sensing sites;

each of said pressure sensing sites including:
a current emitter electrode, and
a companion current collector electrode surrounding and spaced from said emitter electrode, means electrically connecting a series of said emitter electrodes together in a row;

means electrically connecting an array of said current collector electrodes together in a column disposed at an angle to said row;

said emitter and collector electrode connecting means each being arranged with like rows and columns of connecting means;

a resilient platen having a topside adapted to contact an object and an underside with a rough flexible electrically conductive layer engaging said emitter and collector electrodes;

said layer providing along the platen between each emitter electrode and its companion collector electrode a resistance which is less than the resistance between each emitter electrode and adjacent non-companion collector electrodes;

control means for applying to the current emitter electrodes in a selected row a predetermined positive voltage potential and for simultaneously applying to the current collector electrodes in a series of selected columns a lower voltage potential to cause, at each pressure-receiving site situated along said selected row, current flow through said layer from said emitter electrode to said collector electrode of said site, said current flow being proportional to the pressure applied to said layer engaging said electrodes of said site;

said control means including multiplexing means for effecting said voltage application in a predetermined sequence among said columns and rows and said control means including means for sequentially monitoring said current flow in said columns and for identifying the locations of the applied pressure among said pressure sensing sites;

whereby both location and magnitude of pressure applied to the platen by the object can be determined.

27. Apparatus according to claim 26 wherein said series of said selected columns includes columns located on at least laterally opposite sides of the monitored column.

28. Apparatus according to claim 26 wherein said control means also simultaneously applies said positive voltage potential to current emitter electrodes in rows immediately adjacent to said selected row.

29. Apparatus according to claim 26 wherein said control means includes amplifier means connected to said collector electrodes for causing said lower voltage potential to be held at virtual ground.

30. A method of producing a machine readable image of an object, comprising the steps of:

applying pressure to the object with a sensor having a resilient platen with a pressure responsive conductive layer contacting a series of current emitter electrodes electrically connected in laterally spaced rows and surrounded by spaced current collector electrodes electrically connected in laterally spaced columns providing an array of sensing sites;

applying to a selected one of said current emitter electrode rows a predetermined positive voltage potential and simultaneously applying to said collector electrode columns a lower voltage potential for causing current to flow from one emitter electrode in said selected row and through said layer only to an immediately adjacent current collector electrode in a selected column;

collecting substantially all of said current flow from said collector electrode of said selected column; and repeating said voltage applying step periodically among said rows and columns and periodically repeating said current collecting step among selected ones of said columns to provide an electrical output related to the shape of the object and the pressure with which it engages the platen.

* * * * *